United States Patent
Diab et al.

(10) Patent No.: US 7,944,221 B2
(45) Date of Patent: May 17, 2011

(54) SYSTEM AND METHOD FOR AUTOMATICALLY DISCOVERING TOTAL TRANSISTOR RESISTANCE IN A HYBRID POWER OVER ETHERNET ARCHITECTURE

(75) Inventors: Wael William Diab, San Francisco, CA (US); Hemanth Nekkileru, San Jose, CA (US); Sesha Thalpasai Panguluri, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 555 days.

(21) Appl. No.: 12/027,605

(22) Filed: Feb. 7, 2008

(65) Prior Publication Data

US 2009/0201037 A1 Aug. 13, 2009

(51) Int. Cl.
G01R 27/00 (2006.01)
G06F 1/26 (2006.01)
(52) U.S. Cl. .................. 324/713; 324/600; 713/300
(58) Field of Classification Search .............. 324/600, 324/713; 713/300
See application file for complete search history.

(56) References Cited

U.S. PATENT DOCUMENTS 6,906,536 B2* 6/2005 Pearce et al. .............. 324/713
7,157,959 B2* 1/2007 Ball et al. .................. 327/427

OTHER PUBLICATIONS

BCM59103, Product Brief, Broadcom Corporation, Apr. 20, 2007.*
BCM59101 Product Brief, Broadcom Corporation.
BCM59103 Product Brief, Broadcom Corporation.

* cited by examiner

Primary Examiner — Melissa J Koval
Assistant Examiner — Farhana Hoque
(74) Attorney, Agent, or Firm — Duane S. Kobayashi

(57) ABSTRACT

A system and method for automatically discovering total transistor resistance in a hybrid power over Ethernet (PoE) architecture. A critical factor for a PoE system is the total resistance of the power FET. Typical PoE systems consist of a single power FET that may be integrated with the controller or external to the controller. In a hybrid architecture the PoE system consists of both an internal power FET and an external power FET. The external power FET can be used to customize a design to meet a particular application or need. The total resistance in the hybrid architecture can be automatically determined using voltage and current measurements of the internal and external power FETs.

11 Claims, 5 Drawing Sheets

US 7,944,221 B2

SYSTEM AND METHOD FOR AUTOMATICALLY DISCOVERING TOTAL TRANSISTOR RESISTANCE IN A HYBRID POWER OVER ETHERNET ARCHITECTURE

BACKGROUND

1. Field of the Invention

The present invention relates generally to power over Ethernet (PoE) and, more particularly, to a system and method for automatically discovering total transistor resistance in a hybrid PoE architecture.

2. Introduction

In a PoE application such as that described in the IEEE 802.3af and 802.3at specifications, a power sourcing equipment (PSE) delivers power to a powered device (PD) over Ethernet cabling. Various types of PDs exist, including voice over IP (VoIP) phones, wireless LAN access points, Bluetooth access points, network cameras, computing devices, etc.

In accordance with IEEE 802.3af, a PSE can deliver up to 15.4 W of power to a single PD over two wire pairs. In accordance with IEEE 802.at, on the other hand, a PSE may be able to deliver up to 30 W of power to a single PD over two wire pairs. Other proprietary solutions can potentially deliver even higher levels of power to a PD. Those or even higher levels of power can also be provided to a PD over four wire pairs.

PSE subsystems fundamentally rely on some control to "turn on" a power FET, which allows current to be transmitted to the PD. An important factor for the PSE is the resistance of the power FET. This resistance value has an effect on the total heat dissipation and the total allowable current that the PSE can deliver to the PD. In a conventional PSE subsystem design, the resistance of the power FET is a known quantity by design. What is needed, however, is a mechanism that enables a determination of the total FET resistance in PSE designs that include multiple power FETs.

SUMMARY

A system and/or method for automatically discovering total transistor resistance in a hybrid PoE architecture, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
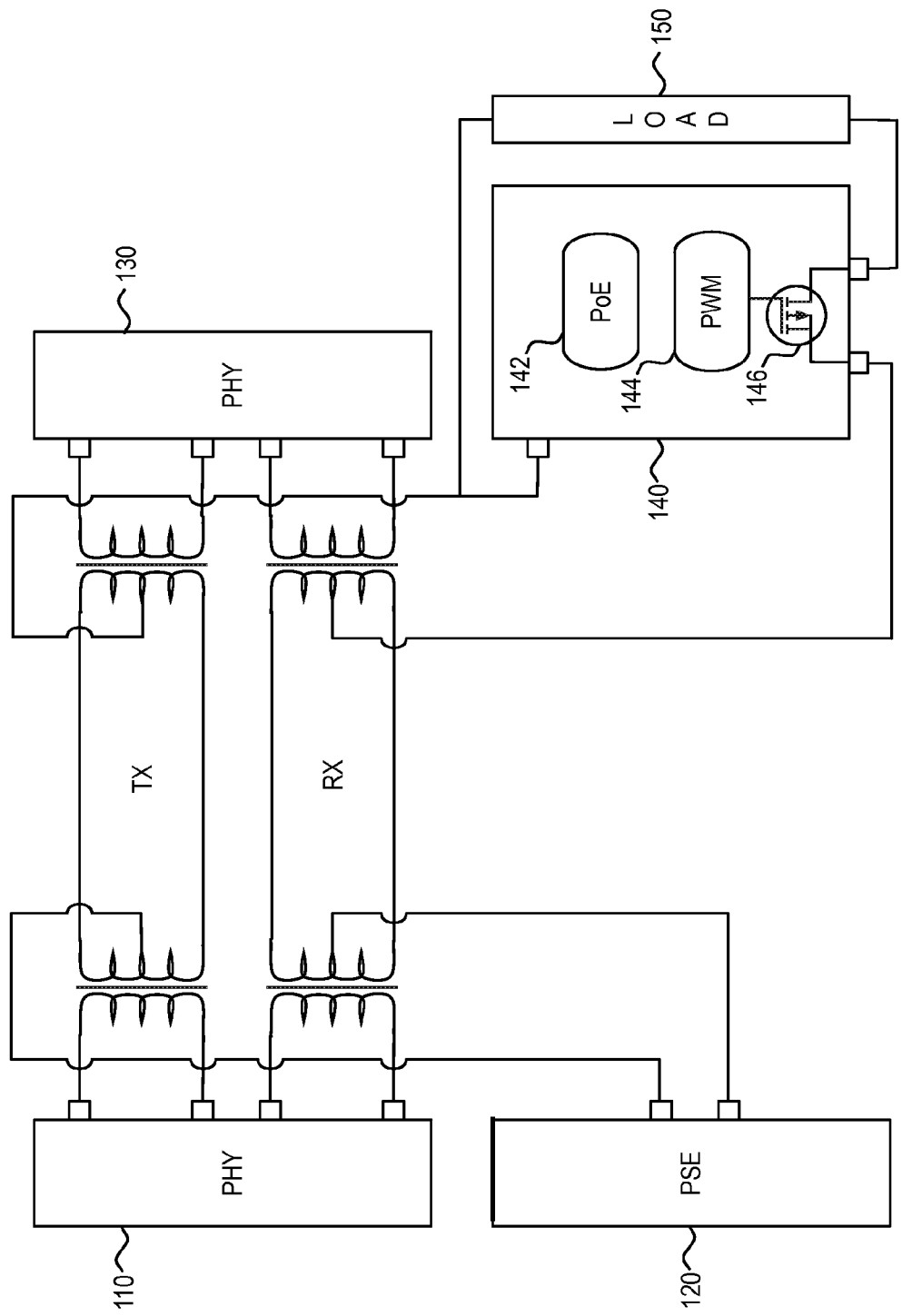
FIG. 1 illustrates an embodiment of a PoE system.

FIG. 1 illustrates an embodiment of a PoE system. As illustrated, the PoE system includes PSE 120 that transmits power to PD 140. Power delivered by PSE 120 to PD 140 is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10 GBASE-T and/or any other layer 2 PHY technology.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at draft specification, on the other hand, a PSE may be able to deliver up to 30 W of power to a PD over two wire pairs. Other proprietary solutions can potentially deliver even higher levels of power to a PD. Those or even higher levels of power can also be provided to a PD over four wire pairs.

In delivering power to a PD, a PSE fundamentally relies on some control to "turn on" a power FET (power switch), which allows current to be transmitted through it to the PD on the other side of the link. In one example, the power FET is an internal FET, which allows for a high level of integration and lower cost. In one embodiment, an integrated PSE controller would include the microcontroller, power switches, as well as current sense, detection, classification, and disconnect functionality.

In general, internal FETs are advantageous in the efficiencies (e.g., space, power, etc.) that are gained in producing an integrated architecture. These efficiencies are gained due to the optimizations that can be implemented in a higher-level system design. By necessity, these optimizations are targeted at a particular application. For example, a PSE controller can be optimized for a given power level (e.g., 30 W per port in an 802.3at application). A consequence of such optimizations is the loss of flexibility. For example, while an internal FET architecture can be optimized for 30 W per port, this power level can also represent a maximum power limit. Further power applications at higher power levels would therefore be precluded from its designed operation.

In contrast to these integrated architectures, the power FET can be designed as an external FET. External FETs allow for more flexibility in the maximum power delivery due to variability of the sizing of the external FET. Unfortunately, these designs suffer from higher cost, lower integration and limitations on the FET selection. Furthermore, external FETs often require odd-shaped heatsinks, which can be prohibitive in very high power applications with multiple ports. For these and other reasons, the external FET approach has limitations where space, cost and cooling can be an issue.

Figure 2:
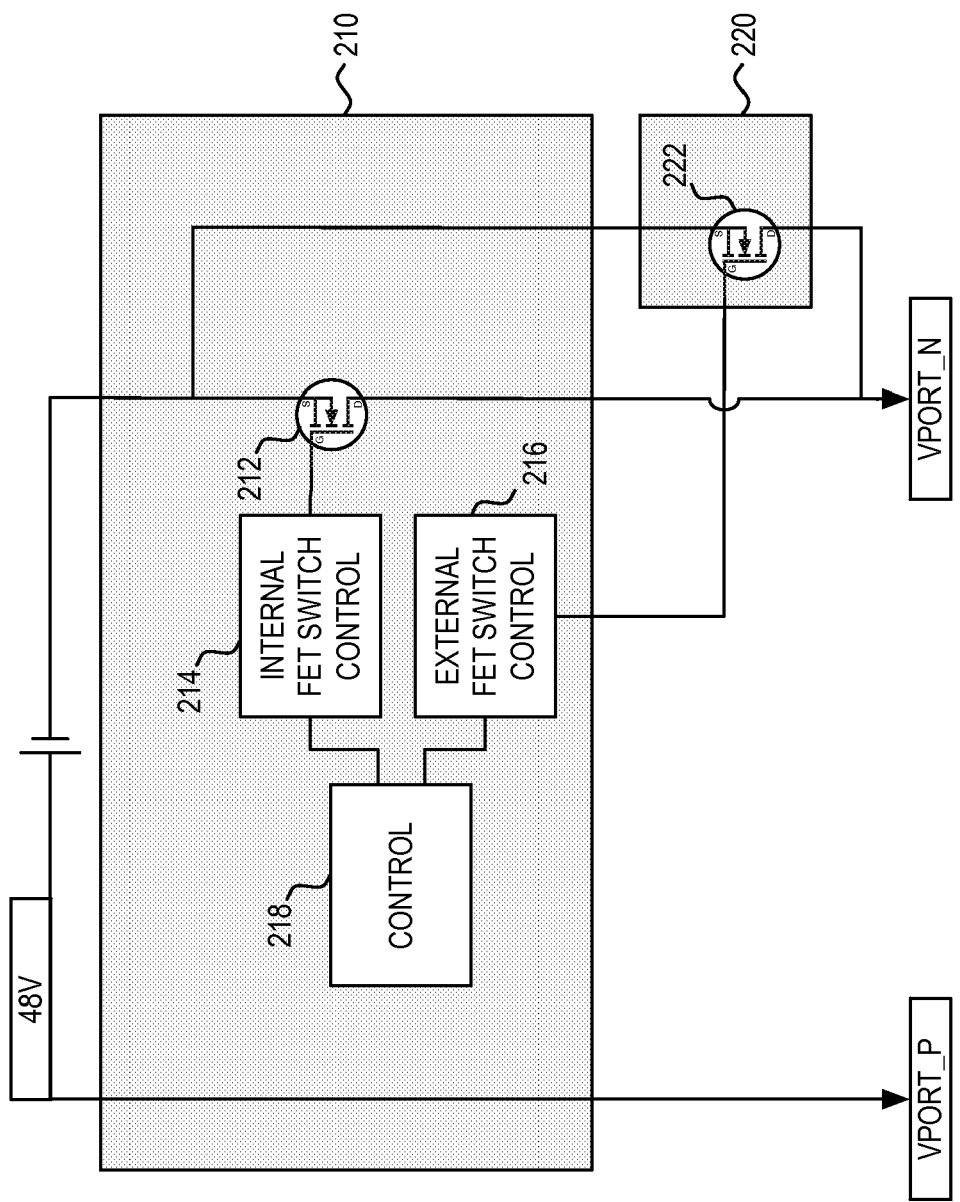
FIG. 2 illustrates an embodiment of a PoE power sourcing equipment hybrid architecture.

It is therefore desirable to retain flexibility in the power FET design process without sacrificing the benefits of optimizations provided with integrated architectures. An example of such a flexible design is illustrated in FIG. 2. As illustrated, a hybrid power FET approach can be defined that is based on both an internal power FET 212 and an external power FET 222. Internal power FET 212 can be optimized for a target application for which the PSE would commonly be used. For example, internal FET 212 can be sized to accommodate 30 W of power. Based on this FET sizing, the integrated architecture of chip 210 can be optimized for that target application. Significantly, the optimization of the integrated architecture does not limit the flexibility of the overall design. Rather, flexibility is enabled through the augmentation of internal FET 212 with external FET 222. More specifically, the maximum power can be boosted with the addition of external FET 222 to internal FET 212.

In higher-power applications, the addition of external FET 222 in parallel to internal FET 212 in a hybrid design acts to reduce the overall resistance of internal FET 212, thereby allowing for higher power. Here, $R_{tot}=R_{int}\|R_{ext}=(R_{int}*R_{ext})/(R_{int}+R_{ext})$. This has several advantages. One advantage is that the size of the external FET required to achieve higher power is considerably smaller than a design that only relies on an external FET. For example, in a 40 W application, an external FET would need to be sized to deliver the full 40 W. This 40 W sizing would present numerous difficulties in design. A hybrid approach, on the other hand, can meet the 40 W application through a combination of an internal FET and an external FET. For example, the internal FET can be designed for a target application of 30 W, while a smaller external FET can be included to provide the additional 10 W of required power. In another example, the internal FET can be designed for a target application of 10 W, while an external FET can be included to provide the additional 30 W of required power. As the external FET in the hybrid solution can be much smaller as compared to the external FET in an external-only solution, greater design flexibility is provided in achieving a higher maximum power. The hybrid approach therefore allows for lower costs as compared to conventional designs.

Another advantage of the hybrid design is that the current drive is also much smaller as the drive strength is related to the size of the FET. Yet another advantage is that the hybrid solution can also be configured as an internal-only solution (i.e., no external FET). In FIG. 2, external FET 222 is illustrated as being contained within area 220. The design process can predefine a physical space requirement for area 220 to accommodate a range of external FET sizes. The predefined nature of area 220 would thereby enable designers to start the design process early yet retain the ability to customize the design at a later stage through the selection of an external FET that would suit a particular application. In other words, area 220 enables a design flexibility that can produce an ideal architecture for applications with space, cost and cooling limitations. Higher port densities are thereby enabled as compared to internal or external only designs.

As illustrated in FIG. 2, internal FET 212 is controlled by internal FET switch control 214, while external FET 222 is controlled by external FET switch control 216. Internal FET switch control 212 and external FET switch control 214 are both coupled to control 218. Control 218 can be embodied as a hardware/software control logic. In operation, control 218 can be designed to effect the relative switching of internal FET 212 and external FET 214. In one scenario, internal FET 212 can be used up until an internal current limit is reached. The decision to switch over to external FET 222 can be based on various factors, including a request for more current from the PD side, and thermal runaway due to internal power dissipation. In general, the flexible architecture enables an intelligent decision to be made regarding the need to effect relative switching between internal FET 212 and external FET 222. In another scenario, external FET 222 would be switched on first. In yet another scenario, both internal FET 212 and external FET 222 can be switched on together and used in parallel. Here, the parallel use of internal FET 212 and external FET 222 from the onset would be useful not for more power, but to reduce Rds_on.

As noted, the flexible design process enables design decisions to determine the relative usage between internal and external FETs. In one example, a multi port PSE can be designed with a few high-power ports, with remaining ports being configured for low-power use. Here, all the ports can use the same chip with the integrated FET, while the few higher-power ports can be configured with an additional external FET.

As noted, an important factor for the PSE is the resistance of the power FET(s), which has an effect on the total heat dissipation and the total allowable current that the PSE can deliver to the PD. In an internal-only or external-only FET design, the resistance of the power FET is a known quantity by design. In a hybrid PSE architecture, on the other hand, the total FET resistance can be a combination of the resistances of the internal and external FETs.

As described above, the hybrid PSE enables a flexible design process wherein an internal FET can be chosen for a target application, while the external FET can be chosen at a later stage to augment the internal FET in meeting the needs of a particular application. The total resistance of the parallel internal and external FETs is $R_{tot}=R_{int}\|R_{ext}=(R_{int}*R_{ext})/(R_{int}+R_{ext})$. At the design stage, this value is dependent on the choice of the external FET. During operation, this value is dependent on the relative operation of the internal and external FETs. For example, even though the PSE is configured with internal and external FETs for a particular port, the operation of the PSE on that port can be based on the relative switching between the internal and external FETs (i.e., either one or both FETs can be switched on at a given point in time). As a number of measurements, enforcements and computations can rely on the value of $R_{tot}$, the system designer must account for any changes in its value. For example, the resistance has an effect on the total heat dissipation and the total allowable current that the PSE can deliver to the PD.

It is a feature of the present invention that the hybrid PSE system can be designed to automatically discover the total resistance of the FETs and correct all measurements, enforcements and computations that rely on the total resistance value. This effectively makes the hybrid FET architecture transparent to the system designer.

Figure 3:
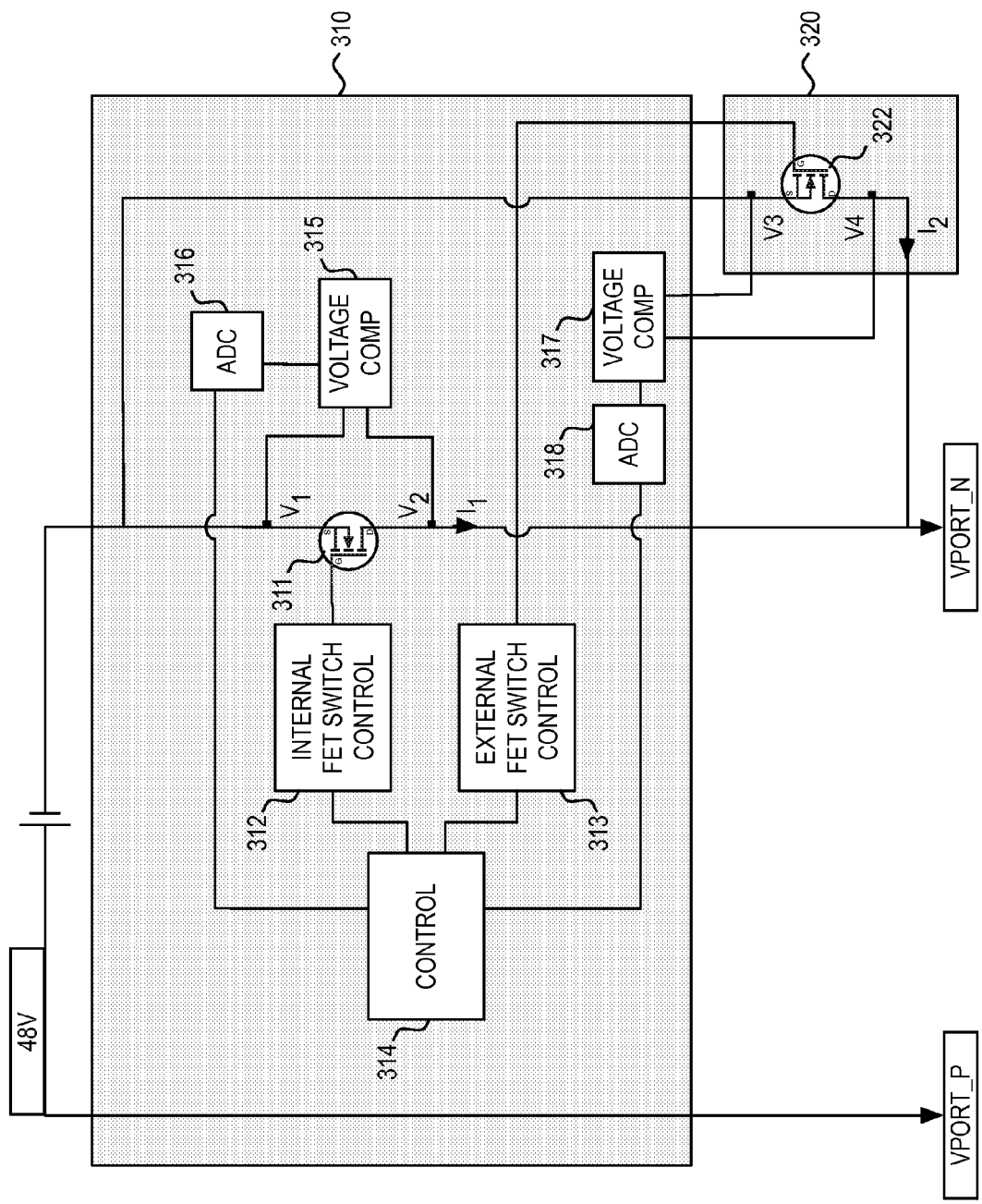
FIG. 3 illustrates an embodiment of a PoE power sourcing equipment architecture that enables a determination of a total FET resistance.

FIG. 3 illustrates an embodiment of the present invention that enables the hybrid PSE system to automatically discover the total resistance of the FETs. As illustrated, the hybrid architecture includes internal power FET 311 and external power FET 322. Internal FET 311 is integrated with chip 310, while external FET 222 contained within area 320 that is separate from chip 310. As illustrated in FIG. 3, internal FET 311 is controlled by internal FET switch control 312, while external FET 322 is controlled by external FET switch control 313. Internal FET switch control 312 and external FET switch control 313 are both coupled to control 314, which can be embodied as a hardware/software control logic. Control 218 is designed to effect the relative switching of internal FET 312 and external FET 322.

In automatically discovering the total resistance of the combination of internal FET 311 and external FET 322, control 314 is designed to determine the individual resistances of internal FET 311 and external FET 322. As illustrated, the resistance of internal FET 311 is determined using voltage comparator 315 and analog/digital converter (ADC) 316, which are designed to provide information that enables a determination of the voltage drop $(V_2-V_1)$ across internal FET 311. Once the current $I_1$ through internal FET 311 is measured, the resistance value of internal FET 311 can be determined by calculating $R_{int}=(V_2-V_1)/I_1$. Similarly, the resistance of external FET 322 is determined using voltage comparator 317 and ADC 318, which are designed to provide information that enables a determination of the voltage drop $(V_4-V_3)$ across external FET 322. Once the current $I_2$ through external FET 322 is measured, the resistance value of external FET 322 is determined by calculating $R_{ext}=(V_4-V_3)/I_2$. The total resistance can then be determined as $R_{tot}=(R_{int}*R_{ext})/(R_{int}+R_{ext})$.

Figure 4:
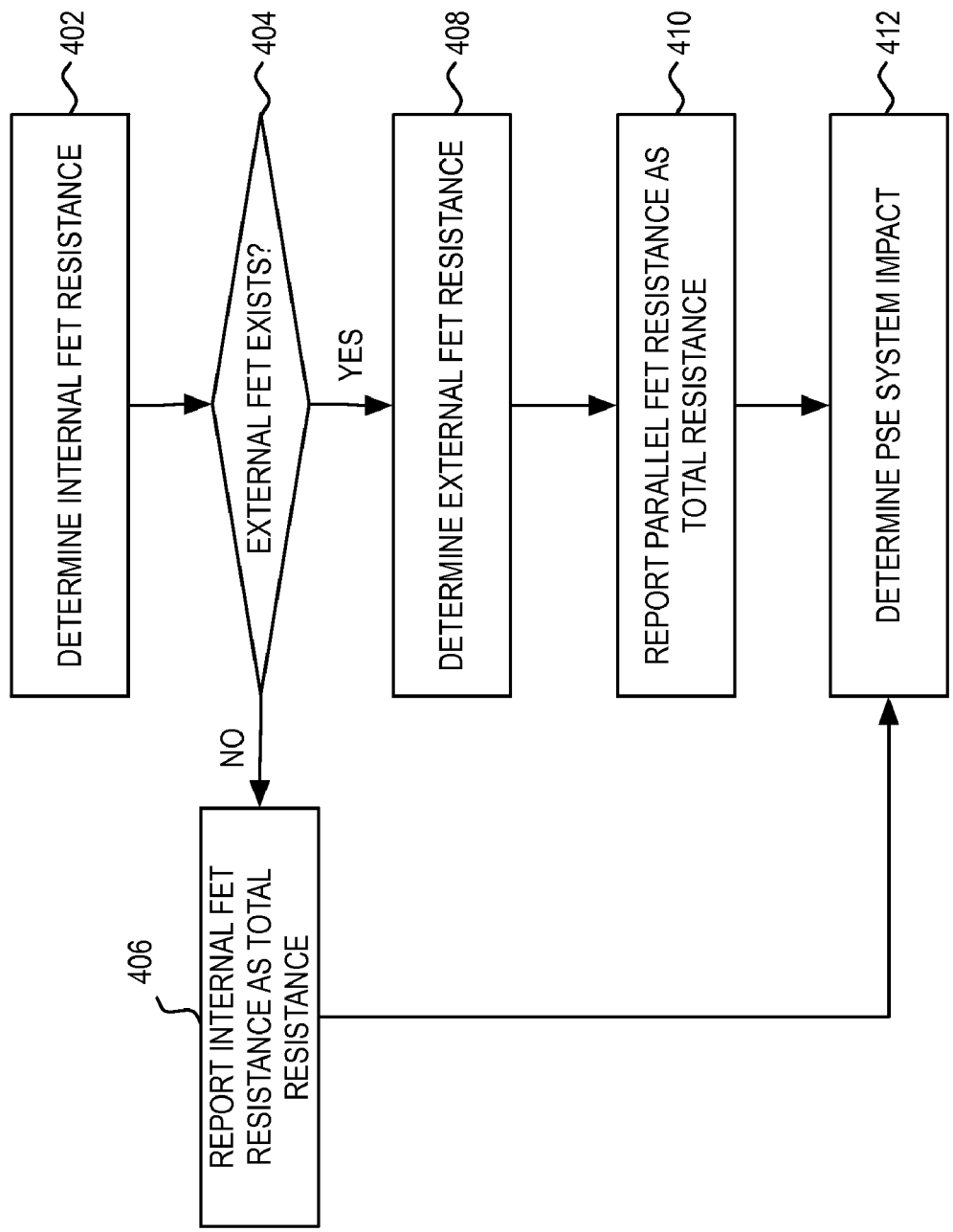
FIG. 4 illustrates an embodiment of a process for determining a total FET resistance in a hybrid PSE architecture.

To further illustrate the features of the present invention, reference is now made to the flowchart of FIG. 4, which illustrates an embodiment of a process for discovering the total resistance in a hybrid PSE architecture at system startup. In this context, there may be no knowledge of the details (e.g., sizing) of the external FET. As illustrated, the process begins at step 402 where the internal FET resistance is determined. Next, at step 404, it is determined whether an external FET exists. As noted above, the PSE may not have an external FET, due to the configuration on that port as an internal-only FET design. If at step 404, it is determined that an external FET does not exist, then the process would continue to step 406 where the determined internal FET resistance is reported as the total resistance.

In one example, the determination that an external FET does not exist can be based on measurements that indicate the existence of an open circuit. In another example, the determination that an external FET does not exist can be based on a pin input or status signal. In one embodiment, the device may be configured, through software dynamically (or at startup) or through a hardware strapping at manufacturing (e.g., inside the package or burned fuse), that there is no external FET. In another embodiment, an auto-detect mechanism can be provided that would measure the external resistance quickly. If an open circuit or bad connection is found (infinite resistance), then that would suggest that there is no external FET attached. The auto-detect mechanism would then report that no external FET was auto discovered.

If it is determined at step 404 that the external FET does exist, then the process would continue to step 408 where the external FET resistance is determined. Next, at step 410, the parallel FET resistance is calculated and reported as the total resistance. From either step 406 or step 410, the reported total resistance is then used at step 412 to determine the PSE system impact. In one example, the determined resistance result can be used to report the maximum current that can be supported for that resistance. As would be appreciated, the reported total resistance can impact the PSE system in many ways due to the impact on heat, current limits, power budgets, etc.

Figure 5:
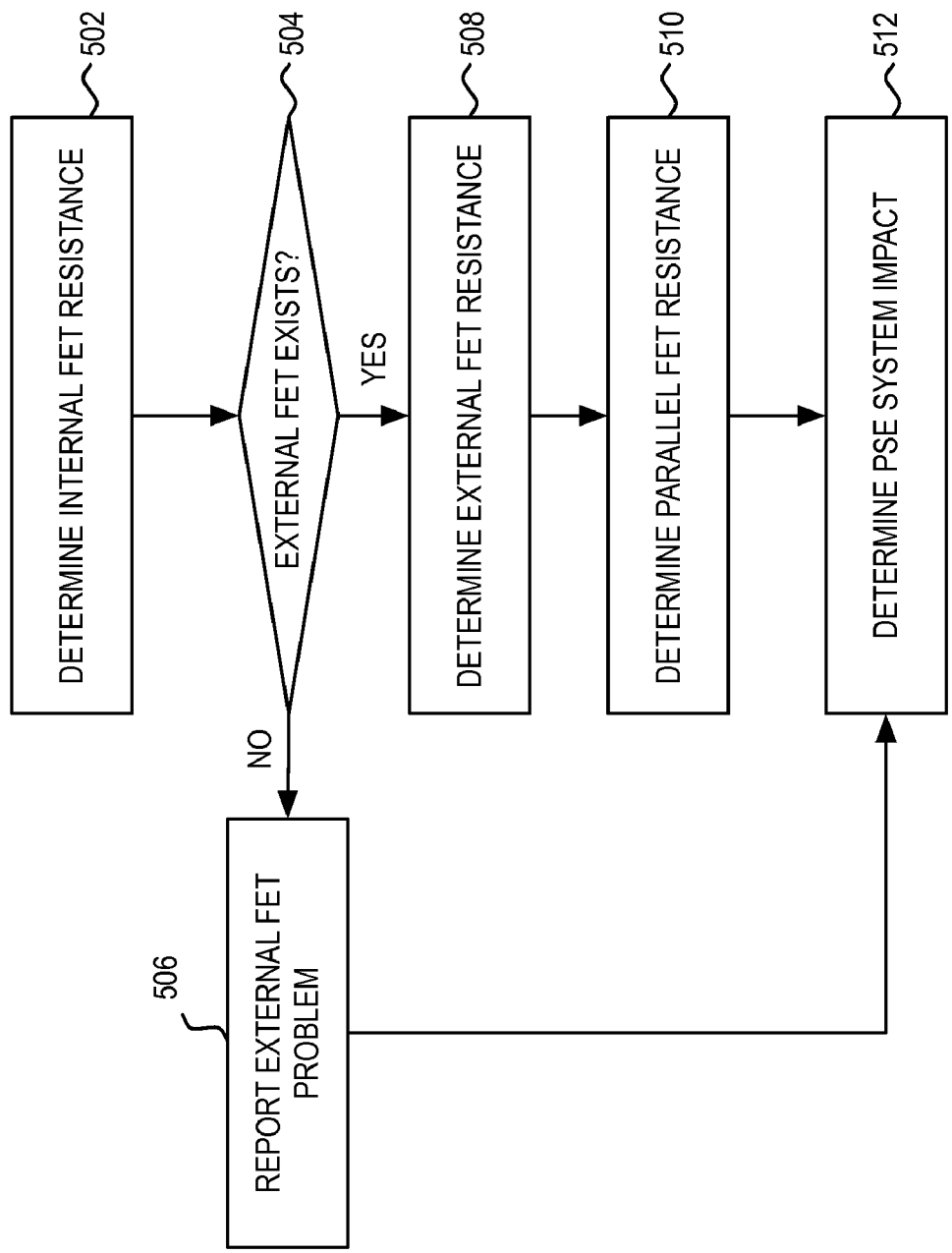
FIG. 5 illustrates an embodiment of a process for performing diagnostics in a hybrid PSE architecture.

In addition to the determination of the total FET resistance at startup, the principles of the present invention can also be used as a diagnostic or error checking tool. FIG. 5 illustrates an embodiment of a diagnostic process in a hybrid PSE architecture. In this context, for example, it may be known that an external FET exists and that it has a certain value. The process of FIG. 5 can then be used to verify the resistance and track its value over time.

As illustrated, the process begins at step 502 where the internal FET resistance is determined, and continues to step 504, where it is determined whether an external FET exists. In one example, the external FET could be determined as failing to exist if the connection to the external FET is lost. The process would then continue to step 506 where a problem in the external FET would be reported. The impact on the PSE system would then be determined at step 512. In one example, the loss of the external FET may not preclude the PSE from delivering power on that port. Instead, a lower current limit may be imposed on that port due to the loss of the external FET's capacity.

If, on the other hand, it is determined at step 504 that the external FET does exist, then the process would continue to step 508 where the external FET resistance is determined. Next, at step 510 the parallel FET resistance is calculated and reported as the total resistance. If this is the first calculation, then the determined resistance can be used to verify whether a designed value is correct. If this is a periodic calculation, then the calculated parallel FET resistance can be tracked relative to prior calculations. This is useful in determining whether the FET resistances have changed over time. Regardless of the scenario, if the determined resistance indicates a change from the prior assumed or calculated value, an impact on the PSE system can be determined at step 512. In one example, the measurements may indicate that the resistance is higher for the same current delivery (possibly due to aging). This would indicate that less power would be delivered to the PD with more heat being dissipated by the system. The system impact may therefore include an adjustment to the power budget attributed to a given PD. As would be appreciated, the particular impact of the reported total resistance on the PSE system can vary by implementation.

As has been described, the principles of the present invention provide for a hybrid architecture that incorporates internal and external FETs. While this hybrid architecture has been described primarily with respect to PSE architectures, it can also be applied to PD architectures.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power sourcing equipment in a power over Ethernet system for discovering a total transistor resistance, comprising:
   an integrated controller, said integrated controller including,
      a first power transistor integrated with a control module into a single chip for delivering power to a powered device;
      a first voltage measurement module that measures voltage across said first power transistor;

a second voltage measurement module that measures voltage across a second power transistor that is external to said integrated controller and in parallel with said first power transistor; and said control module that is operative to calculate a combined resistance of said first power transistor and said second power transistor using voltage information based on said first voltage measurement module and said second voltage measurement module measurements.

2. The power sourcing equipment of claim 1, wherein said control module calculates $R_{total}=(R_{int}*R_{ext})/(R_{int}+R_{ext})$, where $R_{int}=\Delta V_1/I_1$ and $R_{ext}=\Delta V_2/I_2$, wherein $\Delta V_1$ is a voltage across said first power transistor, $I_1$ is a current through said first power transistor, $\Delta V_2$ is a voltage across said second power transistor and $I_2$ is a current through said second power transistor.

3. The power sourcing equipment of claim 1, wherein said integrated controller further includes a first analog-to-digital converter that is connected to said first voltage measurement module and said control module, and a second analog-to-digital converter that is connected to said second voltage measurement module and said control module.

4. The power sourcing equipment of claim 1, wherein said first and second voltage measurement modules are voltage comparators.

5. The power sourcing equipment of claim 1, wherein said second power transistor is an optional transistor that can be designed to augment a power delivery of said first power transistor.

6. The power sourcing equipment of claim 1, wherein said integrated controller further includes powered device detection, powered device classification, and powered device disconnect components.

7. The powered sourcing equipment of claim 1, wherein said integrated controller is included within a single chip, and said second power transistor is external to said single chip.

8. A method for determining a total power transistor resistance in a hybrid power sourcing equipment that includes an internal power transistor integrated with a control module into a single chip, comprising:

determining a resistance of a first power transistor that is contained within said single chip, said determination of said resistance of said first power transistor is made using voltage and current measurements of said first power transistor using first measurement elements within said single chip;

determining a resistance of a second power transistor that is external to said single chip and in parallel with said first power transistor, wherein said determination of said resistance of said second power transistor is made using voltage and current measurements of said second power transistor using second measurement elements within said single chip; and determining a total power transistor resistance using said determined first power transistor resistance and said determined second power transistor resistance.

9. The method of claim 8, wherein said single chip further includes powered device detection, powered device classification, and powered device disconnect components.

10. The method of claim 8, further comprising measuring voltage across said first power transistor and said second power transistor using a voltage comparator in said single chip.

11. The method of claim 8, wherein the total power transistor resistance is determined using $R_{total}=(R_{int}*R_{ext})/(R_{int}+R_{ext})$, where $R_{int}=\Delta V_1/I_1$ and $R_{ext}=\Delta V_2/I_2$, wherein $\Delta V_1$ is a voltage across said first power transistor, $I_1$ is a current through said first power transistor, $\Delta V_2$ is a voltage across said second power transistor and $I_2$ is a current through said second power transistor.

* * * * *